Oct. 11, 1966  W. G. ROE  3,278,721

WELDING SYSTEM

Filed May 3, 1965

INVENTOR

WALTER G. ROE

BY Shoemaker and Mattare

ATTORNEYS

United States Patent Office 3,278,721
Patented Oct. 11, 1966

3,278,721
WELDING SYSTEM
Walter G. Roe, Westport, Conn., assignor to Neoweld Electric Inc., Cornwell Bridge, Conn., a corporation of Connecticut
Filed May 3, 1965, Ser. No. 452,546
1 Claim. (Cl. 219—131)

The present invention relates to a new and novel welding system, and more particularly to a welding system of the multi-station type or the so-called multi-operator or multi-arc type.

The multi-station welding system of the present invention includes a plurality of welding control stations connected with a comon source of D.C. electric power of constant potential which continuously provides D.C. power to the various control stations.

Each of the control stations include a unique adjustable variable impedance means for controlling the amount of current which is provided to the welding means in the form of a welding electrode or the like.

Such multi-station welding systems may be employed in many different applications, and this type of system is particularly adapted for use in shipbuilding, power plant construction, boiler construction and repair, chemical plant construction, oil refining construction and overhaul, building construction and similar applications.

Such multi-station welding systems afford a number of advantages the principals of which are a lower initial capital cost, a much lower cost of installation, much lower maintenance cost and less power requirements as compared with single operator equipment.

Multiple operator welding equipment has been used for some time for metallic electric arc welding. This type of system was widely used in the shipbuilding industry when the welding methods employed a relatively few basic types of coated welding electrodes. The welding quality standards to be met in the past were relatively simple with considerable latitude as to what was acceptable. Accordingly, the performance of prior art type multiple operator welding systems was satisfactory when employing increments or adjustments of approximately 10 amperes of the welding circuit.

As the art of welding developed into the science of welding over the years, quality requirements became much more precise, and codes and standards were revised and brought up to date. Specifications were formulated requiring rigid quality control. As welding requirements were raised, prior art type multiple operator welding systems were unable to meet such standards and have fallen into virtual obsolescence as a production tool.

New welding processes have been developed and are now widely used. Among these new processes are the tungsten arc welding commonly referred to as T.I.G. and high current density continuous electrode welding commonly known as M.I.G. In addition, many new coated electrode types have been developed, notably the low hydrogen types. The new welding processes and electrodes require a welding system with a much more precise control than the known multiple operator systems could provide. As a result, single operator welding equipment employing both motor generators and transformer rectifier arrangements have been employed to give the necessary exact control of the welding arc.

The present invention provides a multi-station welding system which may be used with the latest types of welding processes and wherein infinitely variable control is obtained of the welding current over a particular range. The term infinitely variable welding current is intended to denote variations of current of a fraction of 1 ampere. In other words, an infinitely variable impedance means is provided in the present invention which enables the output welding current to be adjusted through increments of less than 1 ampere. In a typical example, a rheostat is employed so as to enable very fine regulation of the welding current.

The welding system of the present invention accordingly is particularly suitable for use in metallic arc welding with coated electrodes of all types. The system permits direct current tungsten arc welding in extremely thin materials of all types which are normally welded with the tungsten inert gas process. Additionally, the system of the present invention permits the use of a multiple operator welding circuit for the consumable electrode gas shielded welding process.

The welding system of the present invention as mentioned previously includes resistance means having an infinitely variable resistance means. The various resistance means of each control station may be selectively connected in series between the input and output means of the control station so as to thereby control the amount of output welding current. These various resistance means are of different resistance values so as to provide different incremental amounts of output current when connected in the circuit.

The various switch means may be selectively operated so as to connect different combinations of the resistances in series between the input and output means of the control station to thereby vary the output current.

In addition, the infinitely variable resistance means can be independently adjusted so as to provide a fine adjustment of the output current. A particular advantage of this arrangement is the fact that the infinitely variable resistance or rheostat is connected in series with a resistance carrying only a relatively small amount of welding current thereby enabling the rheostat to function successfully in the circuit. Only a relatively small amount of current must pass through the rheostat or infinitely variable resistance means thereby enabling a relatively conventional rheostat to be readily employed for varying the resistance through a certain range of current adjustments.

The welding system of the present invention is also particularly suitable for remote control so that the welding current can be remotely adjusted where the operator is working in confined or remote areas where access to the control station is difficult. This may be readily accomplished in the present invention simply by mounting the various switch means in a remote unit which can be connected through a suitable lead to the control station having the resistances mounted therein.

An object of the present invention is to provide a new and novel welding system which is especially adapted for use in multi-station or multi-operator type applications.

Another object of the invention is the provision of a welding system which enables the multi-station type welding system to be employed with the latest types of welding processes.

A further object of the invention is to provide a welding system which provides continuous infinitely variable welding current within a desired range wherein the welding current can be adjusted to fractions of 1 ampere.

Still another object is to provide a welding system which provides a lower initial capital cost, lower cost of installation, lower cost of maintenance and which requires less power.

Other objects and many attendant advantages of the invention will become more apparent when considered in connection with the specification and accompanying drawings, wherein.

Figure 1:
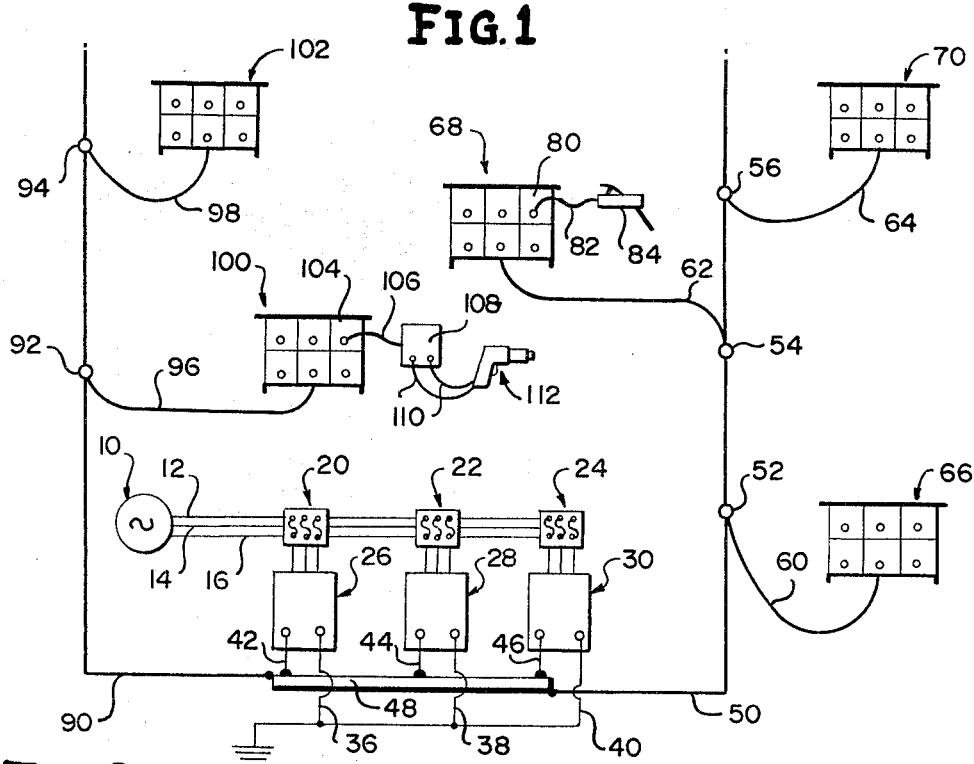
FIG. 1 is a schematic wiring diagram of a welding system according to the present invention.

Referring now to the drawings wherein like reference characters designate corresponding parts throughout the several views, FIG. 1 illustrates the overall system wherein a suitable electric generator is indicated by reference numeral 10 which produces an A.C. voltage which in the typical example may be either 230 or 460 volts. This generator is connected by three leads 12, 14 and 16 with three separate fused safety switches 20, 22 and 24. These safety switches are in turn connected by suitable leads with power units 26, 28 and 30.

These power units may be of the constant potential silicon diode type or rotary direct current generator type, each of which has an output of approximately 500 amperes at a constant potential of 80 volts.

One terminal of each of the power units 26, 28 and 30 is connected to ground by means of leads 36, 38 and 40 respectively. The other output terminal of each of the power units 26, 28 and 30 is connected by means of leads 42, 44 and 46 respectively with a common output means such as a bus bar 48.

The bus bar 48 is connected with a distribution cable 50 which has connected at spaced portions therealong line tap connectors 52, 54 and 56. These connectors are connected with extension cables 60, 62 and 64 respectively which are in turn connected with outlet units 66, 68 and 70 respectively. These outlet units each may include six separate control stations as indicated in FIG. 1, the individual control stations being mounted in drawers which can be moved outwardly for ready access to the control stations when desired.

One of the control stations 80 of the outlet unit 68 is illustrated as being connected by a cable 82 with a welding electrode indicated by reference numeral 84. It will be understood that each of the various control stations may be connected with a suitable welding means as desired. In the illustration, it will be apparent that eighteen separate control stations are operatively connected with the distribution cable 50, and that eighteen separate arcs may accordingly be connected in this portion of the system.

A distribution cable 90 is also connected with bus bar 48, and a pair of line tap connectors 92 and 94 are connected with this distribution cable. Extension cables 96 and 98 connect the connectors 92 and 94 with outlet units 100 and 102 respectively which are similar in construction to the previously described outlet units.

One of the control stations 104 of outlet unit 100 is illustrated as being connected by means of a cable 106 with a timer 108 which in turn is connected by lead means 110 with a conventional stud gun 112. It is apparent that the various control stations of outlet units 100 and 102 may be connected to any suitable welding means as desired, and twelve such control stations are operatively connected with the distribution cable 90.

It will be understood that the various interconnections of the outlet units and welding means to the individual control stations are merely illustrative, and that many variations of such connections can be employed as desired.

Figure 2:
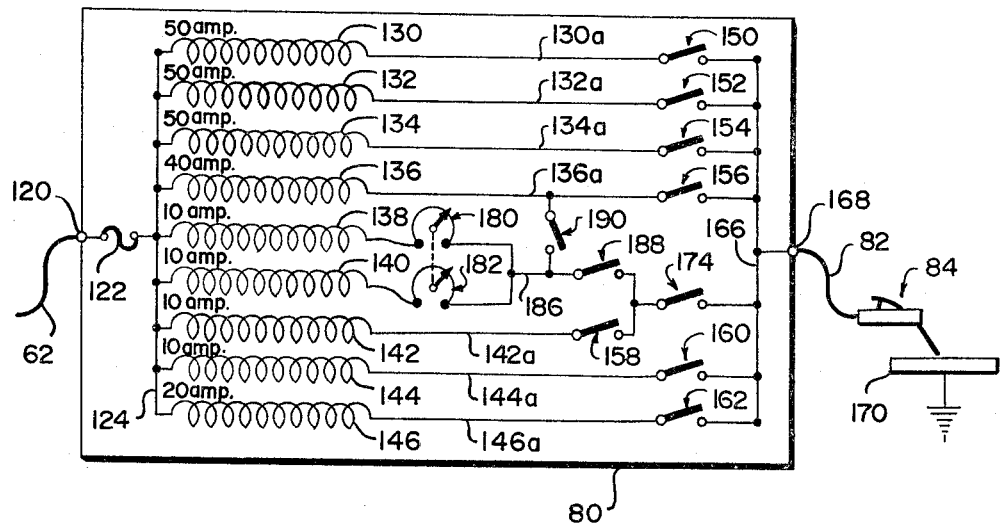
FIG. 2 is a schematic wiring diagram illustrating the electrical connections provided in a particular control unit operatively associated with a suitable welding means.

Referring now particularly to FIG. 2 of the drawings, a schematic wiring diagram is illustrated showing the arrangement of a typical control station of the present invention. This control station may comprise the station 80 previously discussed in connection with outlet unit 68. It will be noted that the extension cable 62 is connected with an input terminal 120 of the control station which in turn is connected through a fuse 122 with a bus bar means or the like 124.

Bus bar means 124 is in turn connected with a plurality of impedance means 130, 132, 134, 136, 138, 140, 142, 144 and 146 which may comprise suitable resistance means as for example in the form of a coil of Nichrome wire having a predetermined size wire and number of turns so as to provide the desired output welding current when connected in the welding circuit. In a typical example wherein the control station is adapted to provide welding currents in small increments up to 250 amperes, the resistance means may be chosen such that when connected in the circuit, the respective resistance means will individually provide the following amounts of output amperage from the control station, it being understood that various combinations of the resistance means may be connected in the circuit so that the output amperage will be additive.

| Resistance means: | Output amperage |
|---|---|
| 130 | 50 |
| 132 | 50 |
| 134 | 50 |
| 136 | 40 |
| 138 | 10 |
| 140 | 10 |
| 142 | 10 |
| 144 | 10 |
| 146 | 20 |

Resistance means 130 is connected by a lead 130a with a selectively operable switch means 150. In a similar manner, resistance means 132, 134, 136, 142, 144, and 146 are connected by leads 132a, 134a, 136a, 142a, 144a and 146a with switches 152, 154, 156, 158, 160 and 162 respectively.

Switch means 150, 152, 154, 156, 160 and 162 are adapted to connect the associated resistance means with an output bus bar 166 which in turn is connected with an output terminal 168. This output terminal is then connected through the cable means 82 previously described with the welding means 84 which is adapted to perform a welding function in conjunction with a workpiece 170 which is connected with ground.

It will be noted that in order to connect resistance means 142 with the output bus bar 166, switch means 158 must be closed, and a further switch means 174 must also be closed.

The two resistance means 138 and 140 are each connected with one side of conventional rheostats or similar infinitely variable resistance means 180 and 182 respectively. These rheostats may be selectively operated to provide adjustments of a fraction of an ampere in the output current, and in the particular example shown need only necessarily be variable through a range from 0 to 10 amperes.

The two rheostats 180 and 182 are ganged together for movement in unison and are connected through the intermediary of a lead 186 with a switch 188 which in turn when closed is adapted to connect the rheostats with the output bus bar when the switch means 174 is also closed.

A switch means 190 is adapted to be selectively operated for interconnecting lead 136a with lead 186 at intermediate points thereof.

It should be understood that the various switch means of the control station may be selectively operated in any suitable manner, and that the switch means may be of relatively conventional construction. The various switch means may each be independently operable or certain of the switch means may be operated in conjunction with one another as desired. In any event, by selectively opening and closing different ones of the switches, it is apparent that any desired output current can be obtained up to 250 amperes through incremental steps of a fraction of an ampere.

It is apparent from the foregoing that there is provided according to the present invention a new and novel welding system of the multi-station type or so-called multi-operated or multi-arc system which is adapted to be used with the latest types of welding processes. Continuous infinitely variable welding current may be obtained within a desired range wherein the current can be varied accurately to a fraction of an ampere. The system is ready adaptable to be operated by remote control, and the welding system provides a lower initial capital cost, lower cost of installation, a lower cost of maintenance and less power is required to operate the system than typical single operator equipment systems.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by that claim.

I claim:

A multi-operator welding system comprising a common source of continuous D.C. electrical power of constant potential, a plurality of control stations, at least one of said control stations including input means and output means, the input means of said one control station being connected with said source of electrical power, the output means of said one control station being adapted to be connected with welding means, said one control station including a plurality of fixed resistance means connected in series between the input means and the output means thereof, all of said fixed resistance means of said one control station being connected in parallel with one another, and infinitely variable resistance means connected in series with one of said fixed resistance means between said input and said output means for infinitely varying the resistance within a certain range, said one control station including switch means connected in series with said input and output means and said resistance means for selectively connecting desired ones of said resistance means between the input means and the output means of said one control station for continuously and uninterruptedly controlling the amount of current passing through the output means and flowing through the arc while a welding arc is established and without interrupting the welding arc, said one control station being adjustable independently of each other control station, said control stations being connected in parallel with said source.

References Cited by the Examiner

UNITED STATES PATENTS

| | | | |
|---|---|---|---|
| 270,352 | 1/1883 | Van Depoele | 323—7 |
| 580,929 | 4/1897 | Colgate | 307—37 |
| 1,948,377 | 2/1934 | Hacker | 317—191 |
| 2,680,225 | 6/1954 | Stevens | 219—136 X |
| 2,774,934 | 12/1956 | Gitzendanner | 338—201 X |
| 2,972,123 | 2/1961 | Blom | 338—122 X |
| 3,177,338 | 4/1965 | Hoffman | 219—131 |

ANTHONY BARTIS, *Acting Primary Examiner.*

JOSEPH V. TRUHE, *Examiner.*